United States Patent
Bufe, III et al.

(10) Patent No.: US 9,373,075 B2
(45) Date of Patent: Jun. 21, 2016

(54) APPLYING A GENETIC ALGORITHM TO COMPOSITIONAL SEMANTICS SENTIMENT ANALYSIS TO IMPROVE PERFORMANCE AND ACCELERATE DOMAIN ADAPTATION

(71) Applicant: International Business Machines Corporation, Armonk, NY (US)

(72) Inventors: John P. Bufe, III, Washington, DC (US); Timothy P. Winkler, Skokie, IL (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 14/104,811

(22) Filed: Dec. 12, 2013

(65) Prior Publication Data

US 2015/0170051 A1    Jun. 18, 2015

(51) Int. Cl.
  G06F 15/18    (2006.01)
  G06N 3/00     (2006.01)
  G06N 3/12     (2006.01)
  G06N 5/02     (2006.01)

(52) U.S. Cl.
  CPC ............. G06N 3/126 (2013.01); G06N 5/022 (2013.01)

(58) Field of Classification Search
  None
  See application file for complete search history.

(56) References Cited

U.S. PATENT DOCUMENTS

| | | | |
|---|---|---|---|
| 7,877,345 B2 | 1/2011 | Nigam et al. | |
| 2009/0282019 A1 | 11/2009 | Galitsky et al. | |
| 2009/0287678 A1 | 11/2009 | Brown et al. | |
| 2010/0023311 A1 | 1/2010 | Subrahmanian et al. | |
| 2011/0125734 A1 | 5/2011 | Duboue et al. | |
| 2011/0258049 A1* | 10/2011 | Ramer | G06F 17/30867 705/14.66 |
| 2012/0041779 A1* | 2/2012 | Boroczky | G06Q 50/22 705/2 |
| 2013/0007055 A1 | 1/2013 | Brown et al. | |
| 2013/0018652 A1 | 1/2013 | Ferrucci et al. | |
| 2013/0018824 A1* | 1/2013 | Ghani | G06N 99/005 706/12 |
| 2013/0066886 A1 | 3/2013 | Bagchi et al. | |
| 2013/0166484 A1* | 6/2013 | Hartmann | G06N 3/08 706/16 |
| 2013/0224714 A1* | 8/2013 | Ajmera | G09B 7/00 434/322 |

OTHER PUBLICATIONS

High, Rob, "The Era of Cognitive Systems: An Inside Look at IBM Watson and How it Works", IBM Corporation, Redbooks, 2012, 16 pages.

(Continued)

*Primary Examiner* — Kakali Chaki
*Assistant Examiner* — Luis Sitiriche
(74) *Attorney, Agent, or Firm* — Stephen R. Tkacs; Stephen J. Walder, Jr.; Reza Sarbakhash

(57) ABSTRACT

A mechanism is provided in a data processing system for applying a genetic algorithm to semantic sentiment analysis. The mechanism provides a sentiment analysis model to a sentiment analysis algorithm. The mechanism trains the sentiment analysis model using a genetic algorithm based on a training corpus of documents with corresponding desired sentiment analysis values for a given domain to form a trained sentiment analysis model. The mechanism performs the sentiment analysis algorithm on an input document using the trained sentiment analysis model to form a domain-specific sentiment analysis result. The mechanism outputs the domain-specific sentiment analysis result.

15 Claims, 9 Drawing Sheets

(56) References Cited

OTHER PUBLICATIONS

Taboada, Maite et al., "Lexicon-Based Methods for Sentiment Analysis", 2011 Association for Computational Linguistics; http://cgi.sfu.ca/~mtaboada/docs/Taboada_etal_SO-CAL.pdf, 2011, 42 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

APPLYING A GENETIC ALGORITHM TO COMPOSITIONAL SEMANTICS SENTIMENT ANALYSIS TO IMPROVE PERFORMANCE AND ACCELERATE DOMAIN ADAPTATION

BACKGROUND

The present application relates generally to an improved data processing apparatus and method and more specifically to mechanisms for applying a genetic algorithm to compositional semantics sentiment analysis to improve performance and accelerate domain adaptation.

Sentiment analysis (also known as opinion mining) refers to the use of natural language processing, text analysis, and computational linguistics to identify and extract subjective information in source materials. Generally speaking, sentiment analysis aims to determine the attitude of a speaker or a writer with respect to some topic or the overall contextual polarity of a document. The attitude may be his or her judgment or evaluation, affective state, or the intended emotional communication.

A basic task in sentiment analysis is classifying the polarity of a given text at the document, sentence, or feature/aspect level. Sentiment analysis determines whether the expressed opinion in a document, a sentence, or an entity feature/aspect is positive, negative, or neutral. Advanced, "beyond polarity" sentiment classification looks, for instance, at emotional states such as "angry," "sad," and "happy."

A different method for determining sentiment is the use of a scaling system whereby words commonly associated with having a negative, neutral or positive sentiment with them are given an associated number on scale (most negative up to most positive) and when a piece of unstructured text is analyzed using natural language processing, the subsequent concepts are analyzed for an understanding of these words and how they relate to the concept. Each concept is then given a score based on the way sentiment words relate to the concept, and their associated score. Alternatively, texts can be given a positive and negative sentiment strength score if the goal is to determine the sentiment in a text rather than the overall polarity and strength of the text.

SUMMARY

In one illustrative embodiment, a method, in a data processing system, is provided for applying a genetic algorithm to semantic sentiment analysis. The method comprises providing, by the data processing system, a sentiment analysis model to a sentiment analysis algorithm. The method further comprises training, by the data processing system, the sentiment analysis model using a genetic algorithm based on a training corpus of documents with corresponding desired sentiment analysis values for a given domain to form a trained sentiment analysis model. The method further comprises performing, by the data processing system, the sentiment analysis algorithm on an input document using the trained sentiment analysis model to form a domain-specific sentiment analysis result. The method further comprises outputting, by the data processing system, the domain-specific sentiment analysis result.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
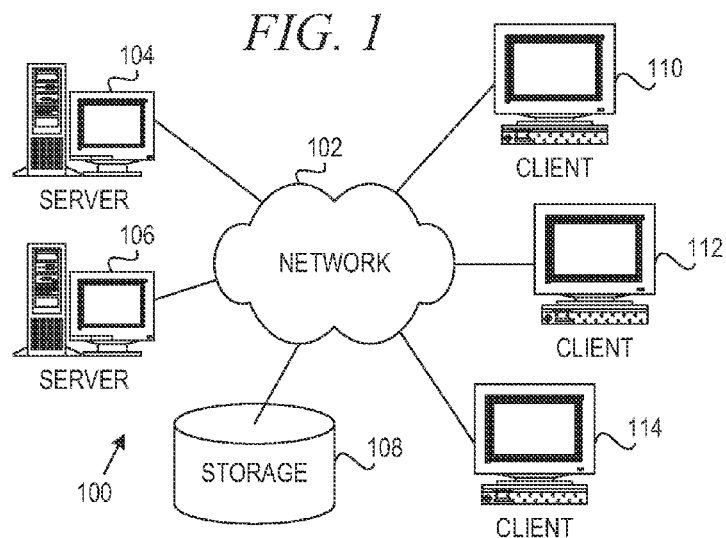
FIG. 1 depicts a pictorial representation of an example distributed data processing system in which aspects of the illustrative embodiments may be implemented.

The illustrative embodiments provide a mechanism for applying a genetic algorithm to compositional semantics sentiment analysis to improve performance and accelerate domain adaptation. Sentiment analysis determines the overall sentiment value through an initial set of values and rules defining combinations of different types of tokens, phrases, sentences, and paragraphs. These initial values and rules may not arrive at the optimal or correct solution in some cases or for certain domains. The mechanism of the illustrative embodiments improves the overall results and can also be used to accelerate domain adaptation by modifying the values specifically for documents in a certain field. The mechanism of the illustrative embodiments provides a solution to make the sentiment analysis model more realistic, to provide higher precision and recall, and to help customize the model for specific domains.

The illustrative embodiments provide a training set of tokens, phrases, sentences, paragraphs, or documents with desired sentiment values at any given level. The mechanism of the illustrative embodiment uses the training set to compare against sentiment values generated by a semantic sentiment analysis component. At each position where the values differ, starting from the deepest part of the parse tree, the mechanism traverses down the tree to discover where the difference originates. The mechanism creates modifications to the rules and/or initial values to minimize overall distance from the expected results using a genetic algorithm.

A genetic algorithm (GA) is a search heuristic that mimics the process of natural selection. This heuristic, also sometimes called a metaheuristic, is routinely used to generate useful solutions to optimization and search problems. Genetic algorithms belong to a larger class of evolutionary algorithms (EA), which generate solutions to optimization problems using techniques inspired by natural evolution, such as inheritance, mutation, selection, and crossover. In a genetic algorithm, a population of candidate solutions (called individuals, creatures, or phenotypes) to an optimization problem is evolved toward better solutions. Each candidate solution has a set of properties (its chromosomes or genotype), which can be mutated and altered.

The evolution usually starts from a population of randomly generated individuals, and is an iterative process, with the population in each iteration called a generation. In each generation, the fitness of every individual in the population is evaluated; the fitness is usually the value of the objective function in the optimization problem being solved. The more fit individuals are stochastically selected from the current population, and each individual's genome is modified (recombined and possibly randomly mutated) to form a new generation. The new generation of candidate solutions is then used in the next iteration of the algorithm. Commonly, the algorithm terminates when either a maximum number of generations has been produced, or a satisfactory fitness level has been reached for the population.

A typical genetic algorithm requires a genetic representation of the solution domain and a fitness function to evaluate the solution domain. Initially, many individual solutions may be randomly generated to form an initial population. The population size depends on the nature of the problem, but typically contains several hundreds or thousands of possible solutions. Traditionally, the population is generated randomly, allowing the entire range of possible solutions (the search space). Occasionally, the solutions may be "seeded" in areas where optimal solutions are likely to be found.

During each successive generation, a proportion of the existing population is selected to breed a new generation. Individual solutions are selected through a fitness-based process, where fitter solutions (as measured by a fitness function) are typically more likely to be selected. Certain selection methods rate the fitness of each solution and preferentially select the best solutions. Other methods rate only a random sample of the population, as the former process may be very time-consuming.

The fitness function is defined over the genetic representation and measures the quality of the represented solution. The fitness function is always problem dependent. For instance, in the illustrative embodiment, one wants to arrive at the known sentiment values of the training set. A representation of such a solution might be an array of sentiment value modifications, which may be values to add to or subtract from sentiment values or multipliers. The fitness of the solution depends on how likely the solution is to arrive at the known sentiment values of the training set.

Once the genetic representation and the fitness function are defined, a GA proceeds to initialize a population of solutions and then to improve it through repetitive application of the mutation, crossover, inversion and selection operators. Over time for a specific domain, the rules and initial values will settle into an optimal position that will most accurately depict the expressed sentiment expected by the user. The advantage of this mechanism is that it will be able to constantly adapt to any set of documents it is given while considering a general baseline and also acknowledge all levels of the parse tree.

Figure 2:
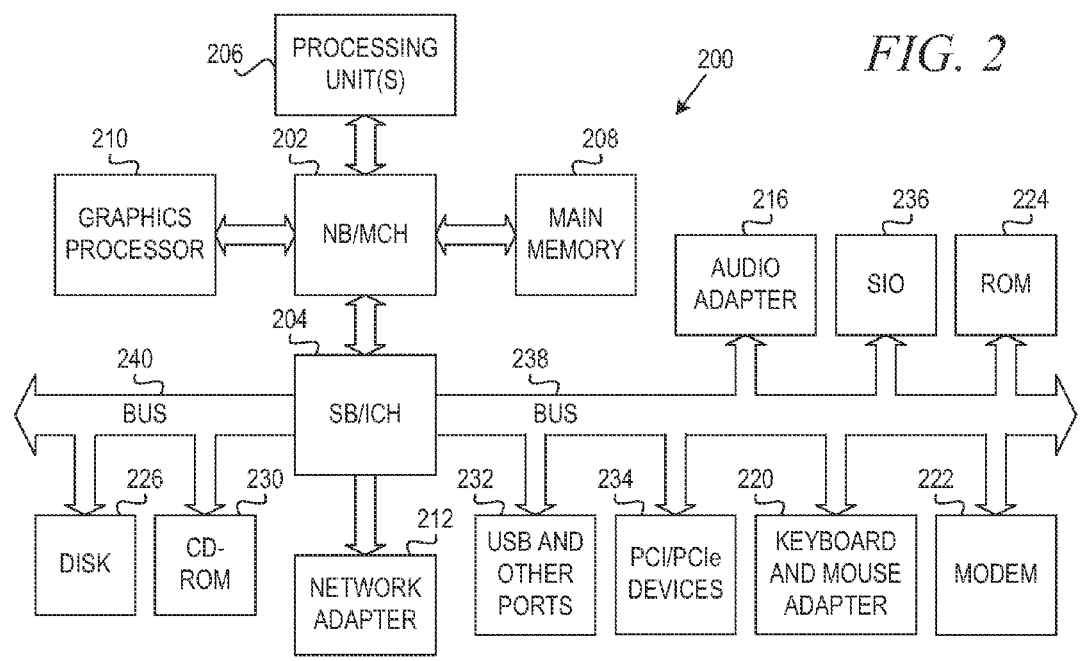
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
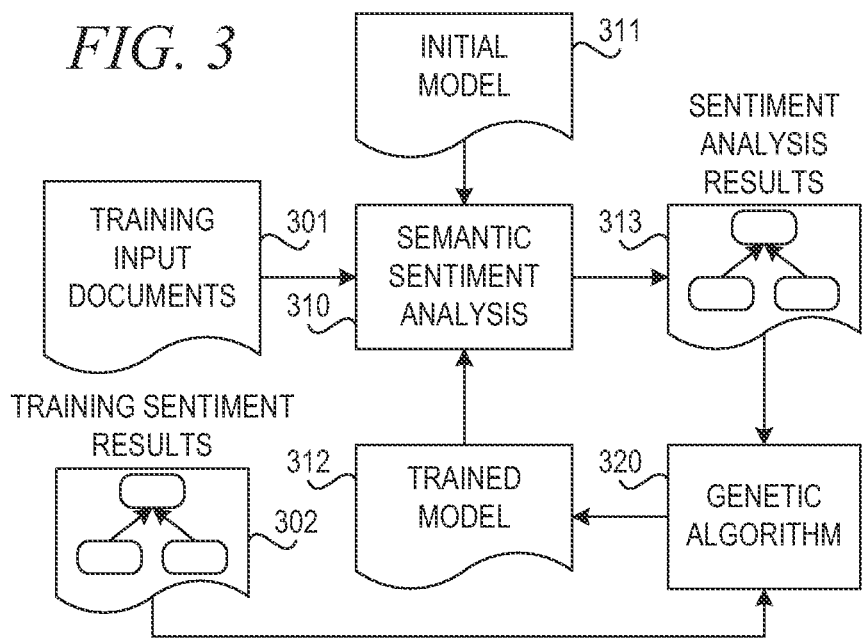
FIG. 3 is a block diagram illustrating training of a genetic algorithm to be applied to sentiment analysis in accordance with an illustrative embodiment.

FIG. 3 is a block diagram illustrating training of a genetic algorithm to be applied to sentiment analysis in accordance with an illustrative embodiment. Training input documents 301 are provided to semantic sentiment analysis component 310. Training input documents 301 may comprise sample tokens, phrases, sentences, paragraphs, or documents for which desired sentiment values are known. The parse trees with known sentiment values, training sentiment results 302, for training input documents 301 are provided to genetic algorithm component 320.

Semantic sentiment analysis component 310 receives training input documents 301 and generates sentiment analysis results 313. Genetic algorithm component 320 receives sentiment analysis results 313 and training sentiment results 302. Genetic algorithm component 320 starts with the annotated set of training documents, training sentiment results 302, which have sentiment values for any desired levels in the parse tree, and sentiment analysis results 313, which have been parsed and analyzed by semantic sentiment analysis component 320.

At each point where there is a difference between the expected and generated value, genetic algorithm component 320 determines the appropriate modifications to the rules and/or initial values to minimize the overall distance from the expected values to form trained model 312.

In the genetic algorithm, the initial population is the original set of values and rules, i.e., initial model 311. The genetic algorithm calculates the fitness of each individual using the absolute value of the distance from the generated value to the expected value weighted by the amount of change from the initial values (the lower the fitness score the better in this case). The population gives rise to more individuals through slight modifications to the values (mutation) and taking parts from multiple different individuals (crossover). For each instance of a genetic algorithm, there will potentially be more than one completely fit individual. The class of highest performing individuals is then saved for future instances of the same structure and the individual with the best overall fitness is chosen. Genetic algorithm component 320 stores the individual with the best overall fitness as trained model 312.

In this way, when a corpus of domain-specific documents is used as a training set, certain constructs and terms will be used more prevalently in specific formats, which allows for rapid domain adaptation. As genetic algorithm component 320 encounters more training input documents 301, genetic algorithm component 320 fine tunes training model 312 such that the results of semantic sentiment analysis 310 become more precise for the specific domain.

Figure 4:
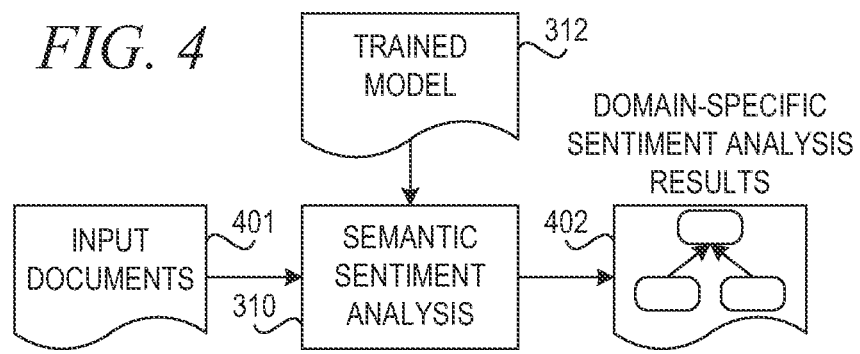
FIG. 4 is a block diagram illustrating semantic sentiment analysis using a model trained via a genetic algorithm in accordance with an illustrative embodiment.

FIG. 4 is a block diagram illustrating semantic sentiment analysis using a model trained via a genetic algorithm in accordance with an illustrative embodiment. Semantic sentiment analysis component 310 receives input documents 401. Semantic sentiment analysis component 310 receives trained model 312, which is trained using a domain-specific corpus of documents having known parse trees with desired sentiment values. Semantic sentiment analysis component 310 uses trained model 312 to determine domain-specific sentiment analysis results 402.

Figure 5:
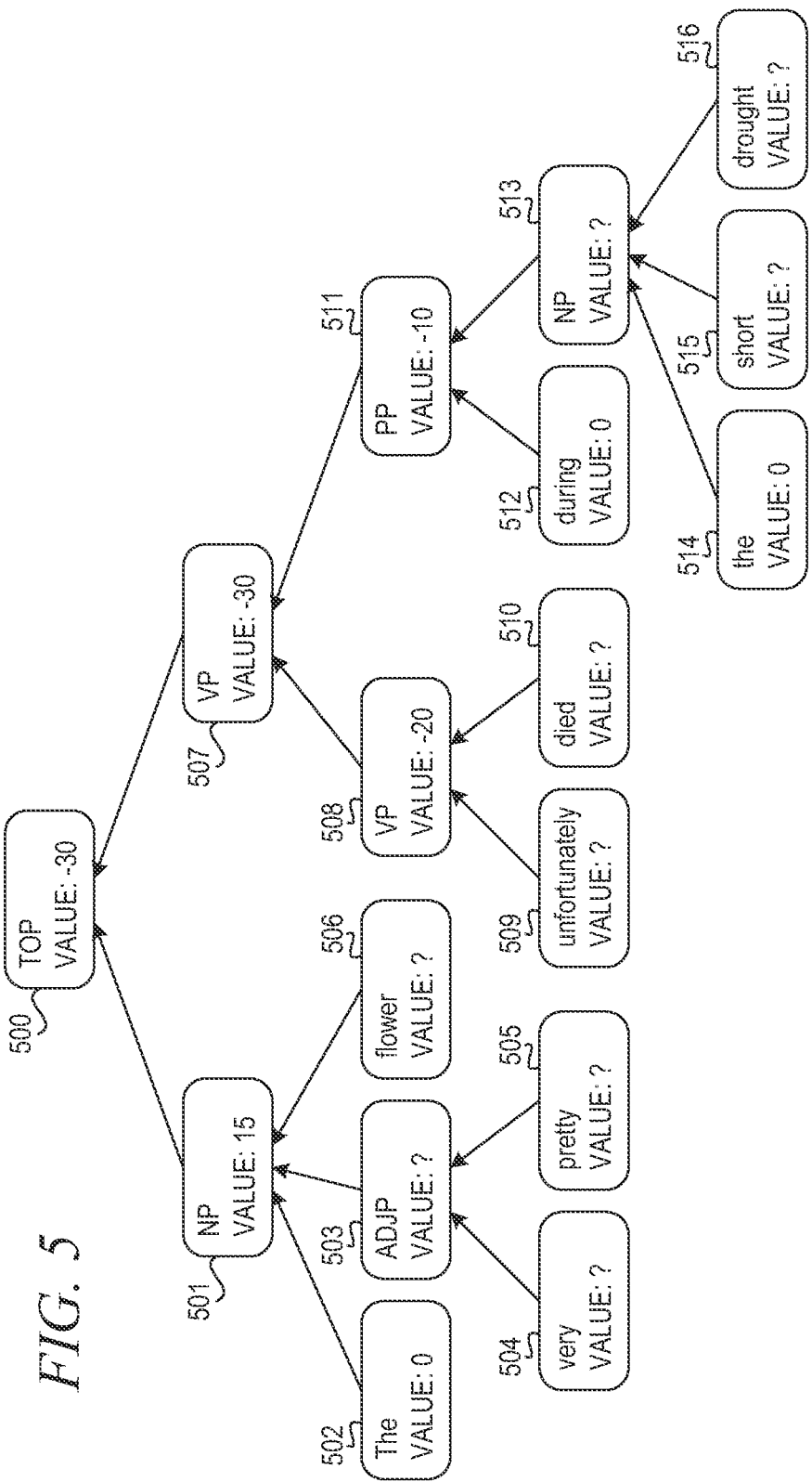
FIG. 5 depicts an example parse tree for a desired result of semantic sentiment analysis in a particular domain in accordance with an illustrative embodiment.

FIG. 5 depicts an example parse tree for a desired result of semantic sentiment analysis in a particular domain in accordance with an illustrative embodiment. The depicted example represents a single sentence, "The very pretty flower unfortunately died during the short drought," using nodes 500-516. The top node 500 represents the desired sentiment value for the entire sentence. In the depicted example, the desired sentiment value is −30, indicting a negative sentiment.

Beneath the top node are a noun phrase node, NP 501, and a verb phrase node, VP 507. Noun phrase 501 represents the phrase, "The very pretty flower," and verb phrase 507 represents the phrase, "unfortunately died during the short drought." In the depicted example, the noun phrase 501 has a desired sentiment value of 15, and verb phrase 507 has a desired sentiment value of −30. Verb phrase 508 represents the phrase, "unfortunately died," and prepositional phrase 511 represents the phrase, "during the short drought." In the depicted example, verb phrase 508 has a desired sentiment value of −20, and prepositional phrase 511 has a desired sentiment value of −10. For some nodes, such as the node for the word "very" in node 504, the desired sentiment value is not known.

Figure 6:
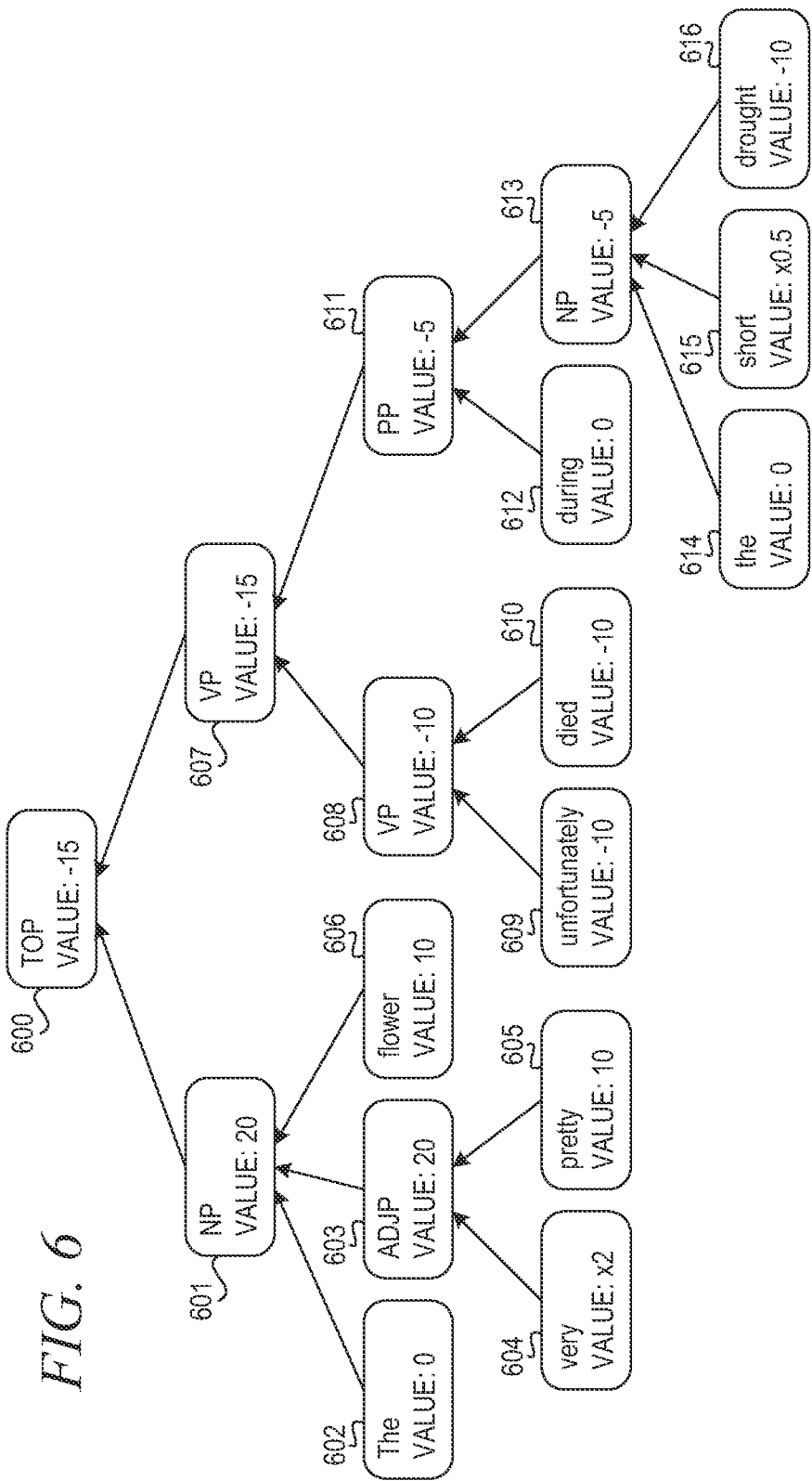
FIG. 6 depicts an example parse tree for an actual result of semantic sentiment analysis in accordance with an illustrative embodiment.

FIG. 6 depicts an example parse tree for an actual result of semantic sentiment analysis in accordance with an illustrative embodiment. The top node 600 represents the determined sentiment value for the entire sentence. In the depicted example, the sentiment value is −15, indicting a negative sentiment. Beneath the top node are a noun phrase node, NP 601, and a verb phrase node, VP 607. In the depicted example, the noun phrase 601 has a sentiment value of 20, and verb phrase 607 has a sentiment value of −15. As seen in FIG. 6, the values for all nodes 600-616 are known for the training sample for a particular field or domain.

More particularly, the sentiment values of child nodes contribute to their parent nodes according to various rules of the sentiment analysis component. For instance, noun phrase 601 and verb phrase 607 contribute to the top node 600. In a sentence, the value of the predicate (verb phrase in this case) is always taken. Even if the subject is positive, the negativity of the predicate will be all that determines the overall sentiment. Verb phrase 608 and prepositional phrase 611 contribute to verb phrase node 607.

As seen in FIG. 6, token phrases may have an initial value or a multiplier. For instance, in node 604, the word "very" has a multiplier of "×2," while in node 605, the word "pretty" has an initial value of 10. Node 604 and node 605 contribute to their parent node 603 by applying the multiplier of node 604 to the value of node 605: 10×2=20. Other rules call for adding the values of nodes. In other rules, multipliers are straightforward, as above. Phrases with modifiers (adjectives, adverbs, etc) sum together the modifiers and ignore the head word (noun, verb, etc). Phrases without modifiers simply take the head word. Phrases combine by sum, except at the top node. These rules can also be changed by the genetic algorithm if it sees fit.

Figure 7A:
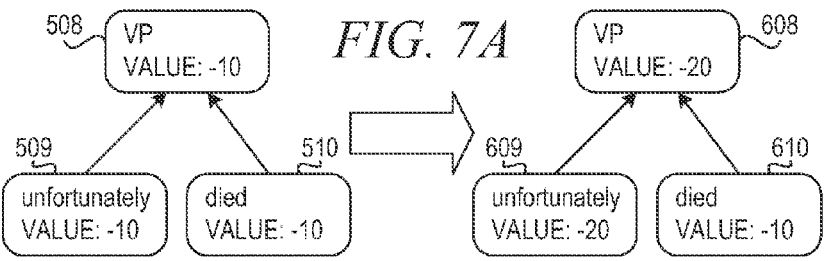
FIGS. 7A-7E depict operation of a genetic algorithm component for modifying results of semantic sentiment analysis to arrive at a desired sentiment analysis result in accordance with the illustrative embodiments.

FIGS. 7A-7E depict operation of a genetic algorithm component for modifying results of semantic sentiment analysis to arrive at a desired sentiment analysis result in accordance with the illustrative embodiments. With reference to FIG. 7A, the genetic algorithm component determines modifications to modify nodes 508-510 to arrive at desired nodes 608-610. More specifically, the actual result of sentiment analysis is the verb phrase node 508 has a sentiment value of −10, while the desired sentiment value for verb phrase node 608 is −20. As seen in FIG. 7, according to the sentiment analysis component, the word "unfortunately" in node 509 has a sentiment value of −10, and the word "died" in node 510 has a sentiment value of −10. The rule being applied here is as follows: modifier+head word (verb)=value of modifier. The genetic algorithm component may attempt many modifications that would result in the desired sentiment value for node 608. For example, the genetic algorithm component may modify the rule or may modify one or both of the initial values for nodes 509, 510. In this particular example, the genetic algorithm determines the modification with the highest fitness is to modify the value of node 509 to result in node 609 having a sentiment value of −20. The result is that node 609 and node 610 contribute to node 608 having the desired sentiment value of −20.

Figure 7B:
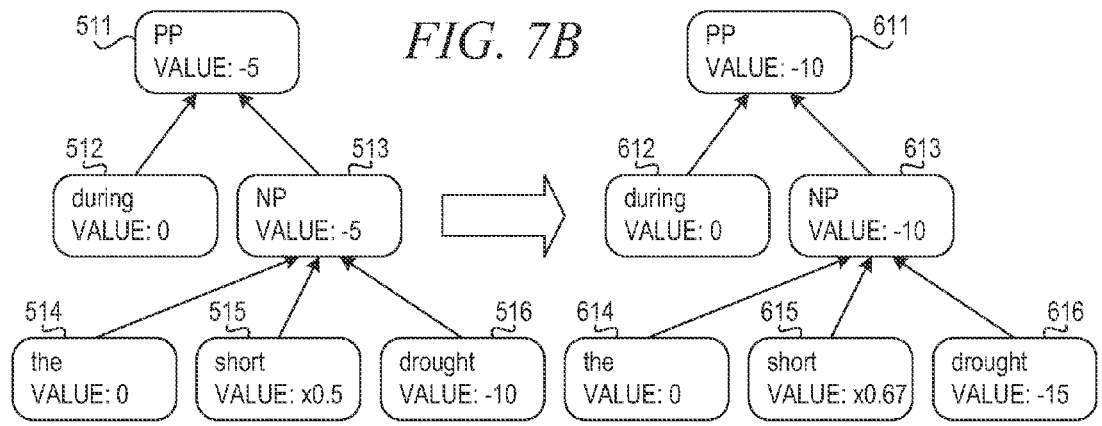

Turning to FIG. 7B, the genetic algorithm component determines modifications to modify nodes 511-516 to arrive at desired nodes 611-616. Because the word "during" in node 512 has a value of 0, it does not contribute to the sentiment value of node 511; therefore, node 511 inherits the sentiment value of noun phrase node 513. It follows that in order to modify the value of node 511 to be −10, as in node 611, the genetic algorithm component must modify the value of node 513 to be −10, as in node 613. Because the word "the" in node 514 has a value of 0, it does not contribute to the sentiment value of node 513. The multiplier of node 515 is applied to the sentiment value of node 516 to result in the value of node 513. Therefore, the genetic algorithm component may modify the rule, modify the multiplier in node 515, may modify the initial value of node 516, or some combination of the above. In the example depicted in FIG. 7B, the genetic algorithm component determines that the modification with the highest fitness is to modify the multiplier of node 515 from ×0.5 to ×0.67, as in node 615, and also to modify the initial value of node 516 from −10 to −15, as in node 616. The result is that nodes 614-616 contribute to node 613 having the desired sentiment value of −10, which also results in node 611 having the desired sentiment value of −10.

Figure 7C:
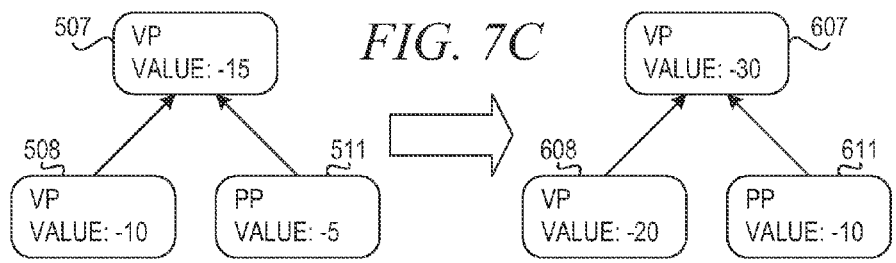

With reference now to FIG. 7C, the genetic algorithm component determines modifications to modify nodes 507-511 to arrive at desired nodes 607-611. Here, verb phrase node 508 is modified to result in verb phrase node 608 having a sentiment value of −20, as described above with reference to FIG. 7A, and prepositional phrase node 511 is modified to result in prepositional phrase node 611 having a sentiment value of −10, as described above with reference to FIG. 7B. Node 608 and node 611 contribute to node 607 having a sentiment value of −30. In this case, the sentiment analysis rule adds the values of nodes 608, 611 to result in the value of node 607.

Figure 7D:
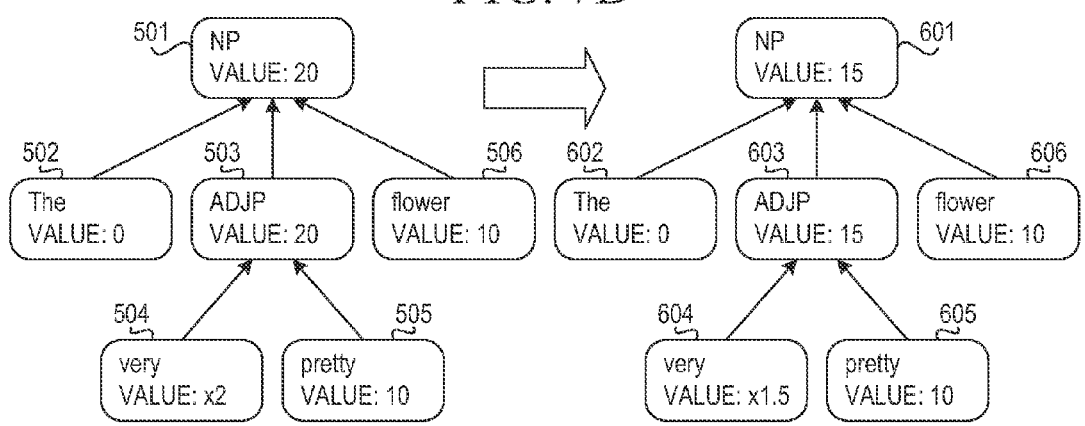

With reference to FIG. 7D, the genetic algorithm component determines modifications to modify nodes 501-506 to arrive at desired nodes 601-606. Because the word "The" in node 502 has a value of 0, it does not contribute to the sentiment value of node 501. In this example, according to the sentiment analysis rules, the value of node 503 dominates the value of node 506; therefore, the genetic algorithm component may arrive at the desired sentiment value for node 601 by only modifying the nodes that contribute to node 503. In this particular example, the genetic analysis component may determine that the modification with the highest fitness is to modify the multiplier of node 504 from ×2 to ×1.5, as in node 604. The result is that nodes 602-606 contribute to node 601 having the desired sentiment value of 15.

Figure 7E:
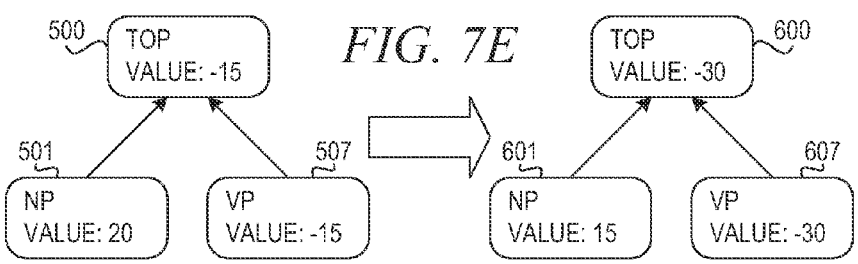

Turning to FIG. 7E, the genetic algorithm component determines modifications to modify nodes 500, 501, 507 to arrive at desired nodes 600, 601, 607. Here, noun phrase node 501 is modified to result in noun phrase node 601 having a sentiment value of 15, as described above with reference to FIG. 7D, and verb phrase node 507 is modified to result in verb phrase node 607 having a sentiment value of −30, as described above with reference to FIG. 7C. Node 601 and node 607 contribute to node 600 having a sentiment value of −30.

Figure 8:
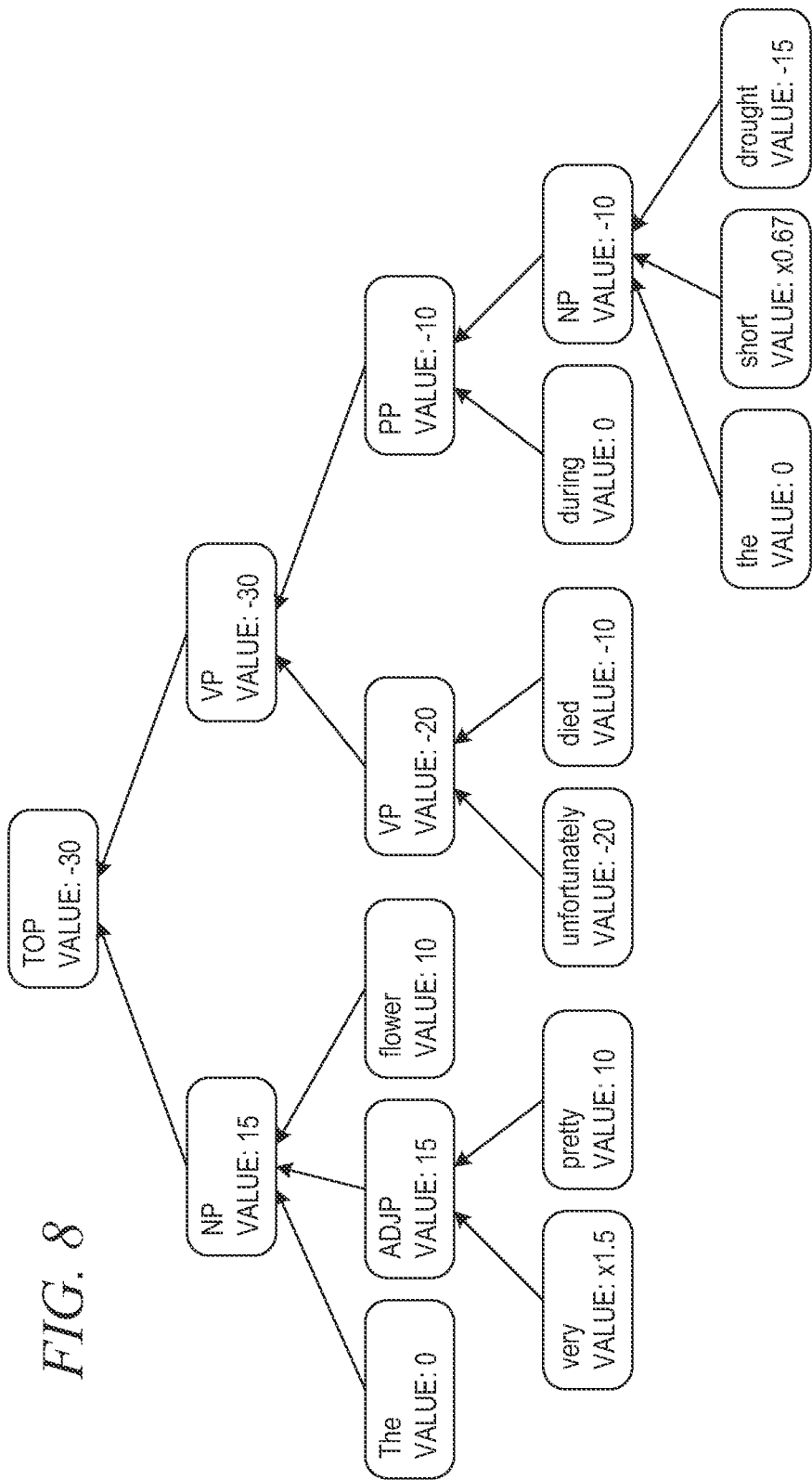
FIG. 8 depicts an example parse tree after applying the genetic algorithm in accordance with an illustrative embodiment.

FIG. 8 depicts an example parse tree after applying the genetic algorithm in accordance with an illustrative embodiment. As the genetic algorithm component continues processing training input documents, the genetic algorithm component considers past modifications to fine-tune the genetic algorithm to the training corpus. With each iteration, the genetic algorithm component determines one or more solutions that provide a highest fitness, which corresponds to a minimum overall distance from the expected values. In this way, the genetic algorithm provides higher precision and recall and helps to customize the model for a specific domain.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 9:
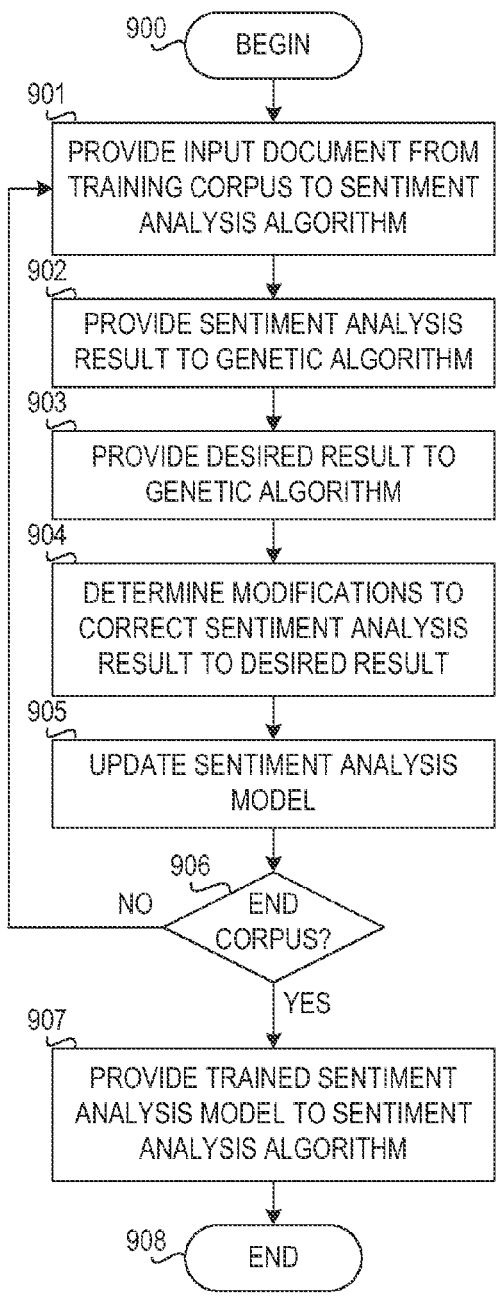
FIG. 9 is a flowchart illustrating operation of a mechanism for training of a genetic algorithm to be applied to sentiment analysis in accordance with an illustrative embodiment.

FIG. 9 is a flowchart illustrating operation of a mechanism for training of a genetic algorithm to be applied to sentiment analysis in accordance with an illustrative embodiment. Operation begins (block 900), and the mechanism provides an input document from a training corpus to a sentiment analysis algorithm component (block 901). The input document may comprise sample tokens, phrases, sentences, paragraphs, or documents for which desired sentiment values are known. The sentiment analysis component provides the sentiment analysis result to a genetic algorithm component (block 902). The mechanism provides a desired result corresponding to the input document to the genetic algorithm component (block 903).

The genetic algorithm component determines modifications to the sentiment analysis model to correct the sentiment analysis result to be as close as possible to the desired result (block 904). For each input document in the training corpus, the genetic algorithm component considers possible modifications to rules and/or initial values in the sentiment analysis model in order to determine a model with a highest fitness, that model being the model that provides the most precise results. The genetic algorithm component updates the sentiment analysis model according to the model with the highest fitness (block 905).

The mechanism then determines whether the input document is the last document in the training corpus (block 906). If the input document is not the last document in the corpus, operation returns to block 901 to provide the next input document from the training corpus to the sentiment analysis algorithm.

If the input document is the last document in the training corpus in block 906, the mechanism provides the trained sentiment analysis model to the sentiment analysis algorithm (block 907). Thereafter, operation ends (block 908).

Figure 10:
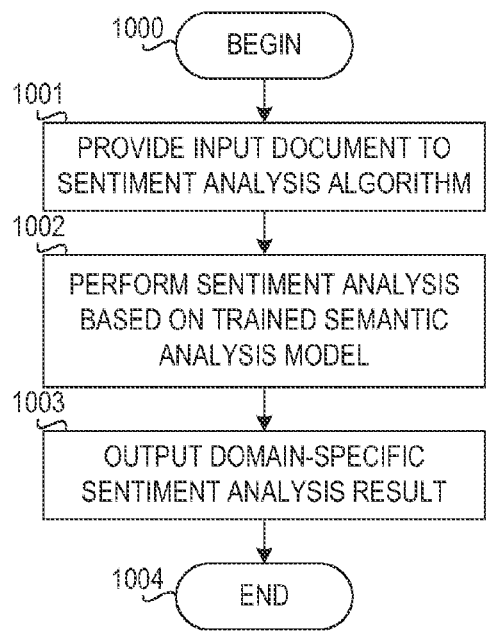
FIG. 10 is a flowchart illustrating operation of a mechanism for semantic sentiment analysis using a model trained via a genetic algorithm in accordance with an illustrative embodiment.

FIG. 10 is a flowchart illustrating operation of a mechanism for semantic sentiment analysis using a model trained via a genetic algorithm in accordance with an illustrative embodiment. Operation begins (block 1000), and the mechanism provides an input document to the sentiment analysis algorithm (block 1001). The mechanism then performs sentiment analysis using the trained semantic analysis model (block 1002), which is trained using a genetic algorithm. The mechanism then outputs the domain-specific sentiment analysis result (block 1003). Thereafter, operation ends (block 1004).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the illustrative embodiments may be applied to a question answering (QA) system. QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

One example of a question/answer generation which may be used in conjunction with the principles described herein is described in U.S. Patent Application Publication No. 2011/0125734, which is herein incorporated by reference in its entirety. Returning to FIG. 1, the QA system may be implemented on one or more computing devices 104, 106 (comprising one or more processors and one or more memories, and potentially any other computing device elements generally known in the art including buses, storage devices, communication interfaces, and the like) connected to a computer network 102. The network 102 may include multiple computing devices 104, 106 in communication with each other and with other devices or components via one or more wired and/or wireless data communication links, where each communication link may comprise one or more of wires, routers, switches, transmitters, receivers, or the like. The QA system and network 102 may enable question/answer (QA) generation functionality for one or more QA system users via their respective computing devices 110, 112, 114. Other embodiments of the QA system may be used with components, systems, sub-systems, and/or devices other than those that are depicted herein.

The QA system may be configured to implement a QA system pipeline that receive inputs from various sources. For example, the QA system 100 may receive input from the network 102, a corpus of electronic documents, QA system users, or other data and other possible sources of input. In one embodiment, some or all of the inputs to the QA system may be routed through the network 102. The various computing devices 104, 106 on the network 102 may include access points for content creators and QA system users. Some of the computing devices 104, 106 may include devices for a database storing the corpus of data. Portions of the corpus of data may also be provided on one or more other network attached storage devices, in one or more databases, or other computing devices not explicitly shown in FIG. 1. The network 102 may include local network connections and remote connections in various embodiments, such that the QA system may operate in environments of any size, including local and global, e.g., the Internet.

In one embodiment, the content creator creates content in a document of the corpus of data for use as part of a corpus of data with the QA system. The document may include any file, text, article, or source of data for use in the QA system. QA system users may access the QA system via a network connection or an Internet connection to the network 102, and may input questions to the QA system that may be answered by the content in the corpus of data. In one embodiment, the questions may be formed using natural language. The QA system 100 may interpret the question and provide a response to the QA system user, e.g., QA system user 110, containing one or more answers to the question. In some embodiments, the QA system may provide a response to users in a ranked list of candidate answers.

The QA system implements a QA system pipeline, which comprises a plurality of stages for processing an input question, the corpus of data, and generating answers for the input question based on the processing of the corpus of data. The QA system pipeline will be described in greater detail hereafter with regard to FIG. 11.

In some illustrative embodiments, the QA system may be the Watson™ QA system available from International Business Machines Corporation of Armonk, N.Y., which is augmented with the mechanisms of the illustrative embodiments described hereafter. The Watson™ QA system may receive an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e., candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 11:
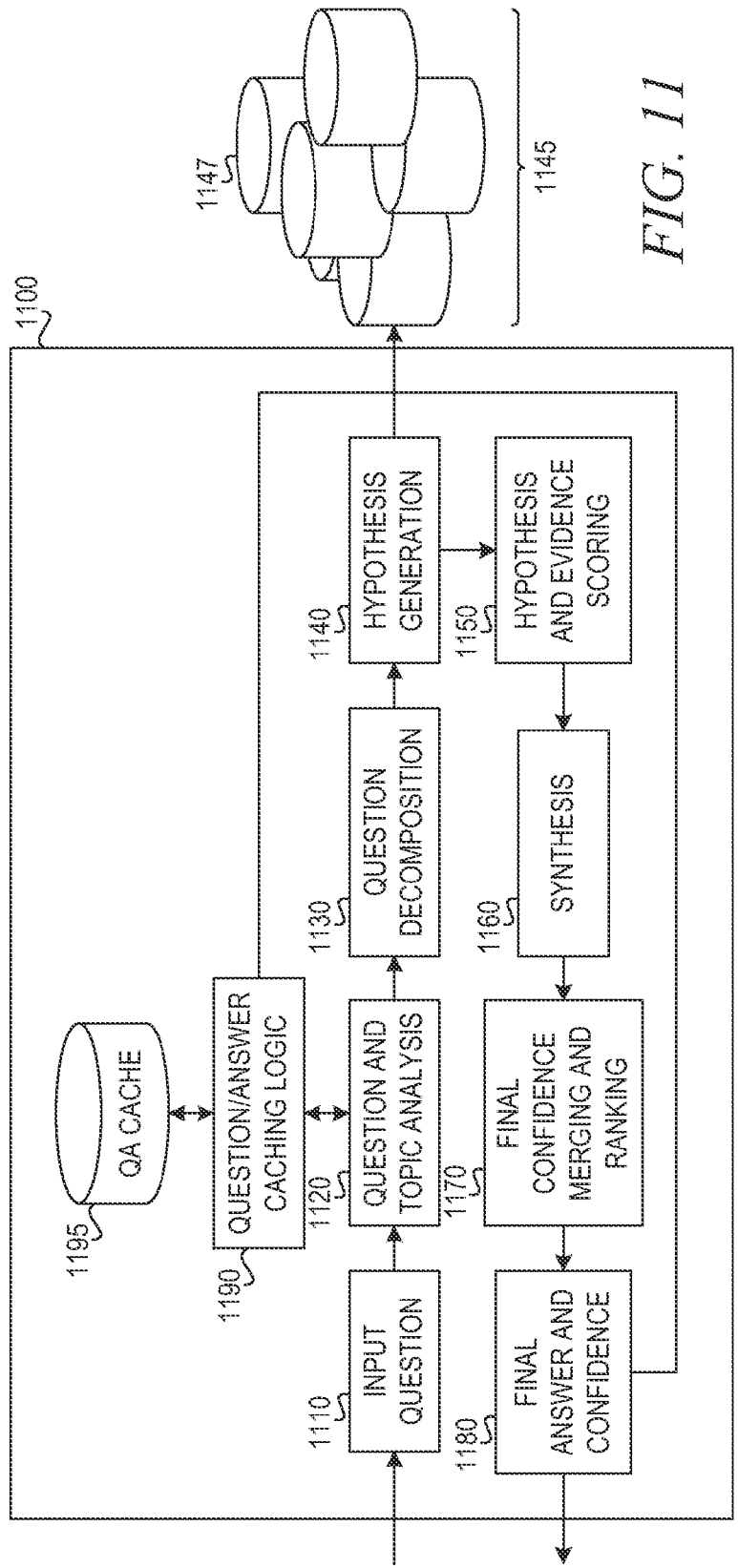
FIG. 11 illustrates a QA system pipeline for processing an input question in accordance with one illustrative embodiment.

FIG. 11 illustrates a QA system pipeline for processing an input question in accordance with one illustrative embodiment. It should be appreciated that the stages of the QA system pipeline shown in FIG. 11 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 11 may be augmented, for example, in one or more of the stages to implement the improved mechanism of the illustrative embodiments described hereafter, additional stages may be provided to implement the improved mechanism, or separate logic from the pipeline 1100 may be provided for interfacing with the pipeline 1100 and implementing the improved functionality and operations of the illustrative embodiments.

As shown in FIG. 11, the QA system pipeline 1100 comprises a plurality of stages 1110-1180 through which the QA system operates to analyze an input question and generate a final response. In an initial question input stage 1110, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 1100, i.e., the question and topic analysis stage 1120, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

Question and topic analysis stage 1120 may use the sentiment analysis techniques of the illustrative embodiments described above. For instance the sentiment of a question may be determined differently for different domains, or corpora, and may be analyzed differently using the techniques described above. Whether a question has a positive or negative sentiment may be an important factor when attempting to answer the question in a given domain.

The identified major features may then be used during the question decomposition stage 1130 to decompose the question into one or more queries that may be applied to the corpora of data/information 1145 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 1145. That is, these various sources themselves, different collections of sources, and the like, may represent a different corpus 1147 within the corpora 1145. There may be different corpora 1147 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 1147 within the corpora 1145.

The queries may be applied to one or more databases storing information about the electronic texts, documents, articles, websites, and the like, that make up the corpus of data/information. The queries being applied to the corpus of data/information at the hypothesis generation stage 1140 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 1140, to generate hypotheses for answering the input question. These hypotheses are also referred to herein as "candidate answers" for the input question. For any input question, at this stage 1140, there may be hundreds of hypotheses or candidate answers generated that may need to be evaluated.

Hypothesis generation stage 1140 may use the sentiment analysis techniques of the illustrative embodiments described above. For instance, a candidate answer may be filtered out if the sentiment of the answer does not match the question. The manner in which a candidate answer is considered, taking into account the sentiment of the question and the candidate answer, may vary depending on the domain or corpus.

The QA system pipeline 1100, in stage 1150, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

Hypothesis and evidence scoring stage 1150 may use the sentiment analysis techniques of the illustrative embodiments described above. For instance, candidate answers having a positive or negative sentiment that matches the sentiment of the input question may be scored higher than candidate answers that do not match.

In the synthesis stage 1160, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 1170 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers").

Here, final confidence merging and ranking stage 1170 may use the aspects of the sentiment analysis techniques of the illustrative embodiments. Candidate answers may be merged if they have a similar sentiment score, for example. Candidate answers may also be ranked based on whether they match the sentiment of the input question. From the ranked listing of candidate answers, at stage 1180, a final answer and confidence score, or final set of candidate answers and confidence scores, may be generated and output to the submitter of the original input question.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for applying a genetic algorithm to semantic sentiment analysis, the method comprising:
   providing, by the data processing system, a sentiment analysis model to a sentiment analysis algorithm;
   training, by the data processing system, the sentiment analysis model using a genetic algorithm based on a training corpus of documents with corresponding desired sentiment analysis values for a given domain to form a trained sentiment analysis model, wherein training the sentiment analysis model using the genetic algorithm comprises for each given training document in the training corpus:
      performing the sentiment analysis algorithm on the given training document to form a sentiment analysis result;
      making modifications to the sentiment analysis model to form a plurality of individual models;
      identifying a best fitness individual model from the plurality of individual models using the genetic algorithm, wherein the best fitness individual model minimizes a distance from desired sentiment analysis values corresponding to the given training document, wherein fitness of each individual model is based on an absolute value of a distance from a generated sentiment value to a desired sentiment value weighted by an amount of change from an initial value in the sentiment analysis model; and
      storing the best fitness individual model as the trained sentiment analysis model;
   performing, by the data processing system, the sentiment analysis algorithm on an input document using the trained sentiment analysis model to form a domain-specific sentiment analysis result;
   outputting, by the data processing system, the domain-specific sentiment analysis result;
   providing the domain-specific sentiment analysis result to a question answering system; and
   performing analysis of an input question or a candidate answer in the question answering system using the domain-specific sentiment analysis result.

2. The method of claim 1, wherein making modifications to the sentiment analysis model using the genetic algorithm comprises modifying rules or token values in the sentiment analysis model.

3. The method of claim 2, wherein a token value comprises a numerical value or a multiplier.

4. The method of claim 1, wherein the input document comprises a sample token, phrase, sentence, paragraph, or document.

5. The method of claim 1, wherein the training corpus of documents comprises sample tokens, phrases, sentences, paragraphs, or documents for which desired sentiment values are known.

6. A computer program product comprising a non-transitory computer readable storage medium having a computer readable program stored therein, wherein the computer readable program, when executed on a computing device, causes the computing device to:
   provide a sentiment analysis model to a sentiment analysis algorithm;
   train the sentiment analysis model using a genetic algorithm based on a training corpus of documents with corresponding desired sentiment analysis values for a given domain to form a trained sentiment analysis model; wherein training the sentiment analysis model comprises for each given training document in the training corpus:
      performing the sentiment analysis algorithm on the given training document to form a sentiment analysis result;
      making modifications to the sentiment analysis model to form individual models;
      identifying a best fitness individual model from the plurality of individual models using the genetic algorithm, wherein the best fitness individual model minimizes a distance from desired sentiment analysis values corresponding to the given training document, wherein fitness of each individual model is based on an absolute value of distance from a generated sentiment value to a desired sentiment value weighted by an amount of change from an initial value in the sentiment analysis model; and
      storing the best fitness individual model as the trained sentiment analysis model;
   perform the sentiment analysis algorithm on an input document using the trained sentiment analysis model to form a domain-specific sentiment analysis result; and
   output the domain-specific sentiment analysis result;
   provide the domain-specific sentiment analysis result to a question answering system; and perform analysis of an input question or a candidate answer in the question answering system using the domain-specific sentiment analysis result.

7. The computer program product of claim 6, wherein making modifications to the sentiment analysis model using the genetic algorithm comprises modifying rules or token values in the sentiment analysis model.

8. The computer program product of claim 7, wherein a token value comprises a numerical value or a multiplier.

9. The computer program product of claim 6, wherein the training corpus of documents comprises sample tokens, phrases, sentences, paragraphs, or documents for which desired sentiment values are known.

10. The computer program product of claim 6, wherein the input document comprises a sample token, phrase, sentence, paragraph, or document.

11. An apparatus comprising:
a processor; and
a memory coupled to the processor, wherein the memory comprises instructions which, when executed by the processor, cause the processor to:
provide a sentiment analysis model to a sentiment analysis algorithm;
train the sentiment analysis model using a genetic algorithm based on a training corpus of documents with corresponding desired sentiment analysis values for a given domain to form a trained sentiment analysis model; wherein training the sentiment analysis model comprises for each given training document in the training corpus:
  performing the sentiment analysis algorithm on the give training document to form a sentiment analysis result;
  making modifications to the sentiment analysis model to form individual models;
  indentifying a best fitness individual model from the plurality of individual models using the genetic algorithm, wherein the best fitness individual model minimizes a distance from desired sentiment analysis values corresponding to the given training document, wherein fitness of each individual model is based on an absolute value of a distance from a generated sentiment value to a desired sentiment value weighted by an amount of change from an initial value in the sentiment analysis model; and
  storing the best fitness individual model as the trained sentiment analysis model;
perform the sentiment analysis algorithm on an input document using the trained sentiment analysis model to form a domain-specific sentiment analysis result;
output the domain-specific sentiment analysis result;
provide the domain-specific sentiment analysis result to a question answering system; and
perform analysis of an input question or a candidate answer in the question answering system using the domain-specific sentiment analysis result.

12. The apparatus of claim 11, wherein making modifications to the sentiment analysis model using the genetic algorithm comprises modifying rules or token values in the sentiment analysis model.

13. The apparatus of claim 12, wherein a token value comprises a numerical value or a multiplier.

14. The apparatus of claim 11, wherein the training corpus of documents comprises sample tokens, phrases, sentences, paragraphs, or documents for which desired sentiment values are known.

15. The apparatus of claim 11, wherein the input document comprises a sample token, phrase, sentence, paragraph, or document.

* * * * *